United States Patent
Santan et al.

(10) Patent No.: US 10,031,760 B1
(45) Date of Patent: Jul. 24, 2018

(54) BOOT AND CONFIGURATION MANAGEMENT FOR ACCELERATORS

(71) Applicant: Xilinx, Inc., San Jose, CA (US)

(72) Inventors: Sonal Santan, San Jose, CA (US); Raymond Kong, San Jose, CA (US); Yenpang Lin, Campbell, CA (US); Jun Liu, San Jose, CA (US); Ashish Gupta, San Jose, CA (US); Spenser Gilliland, San Jose, CA (US); Brian S. Martin, Longmont, CO (US)

(73) Assignee: XILINX, INC., San Jose, CA (US)

( * ) Notice: Subject to any disclaimer, the term of this patent is extended or adjusted under 35 U.S.C. 154(b) by 105 days.

(21) Appl. No.: 15/160,993

(22) Filed: May 20, 2016

(51) Int. Cl.
G06F 15/177 (2006.01)
G06F 9/4401 (2018.01)

(52) U.S. Cl.
CPC .......... *G06F 9/4411* (2013.01); *G06F 9/4403* (2013.01); *G06F 9/4406* (2013.01)

(58) Field of Classification Search
CPC ..... G06F 9/4411; G06F 9/4403; G06F 9/4406
USPC .......................................................... 713/2
See application file for complete search history.

(56) References Cited

U.S. PATENT DOCUMENTS

| 6,373,493 B1* | 4/2002 | Rickard | G06F 3/14 345/520 |
| 9,483,291 B1* | 11/2016 | Chen | G06F 9/45533 |
| 2005/0223382 A1* | 10/2005 | Lippett | G06F 9/4812 718/103 |
| 2007/0283311 A1* | 12/2007 | Karoubalis | G06F 17/5054 326/38 |
| 2008/0159637 A1* | 7/2008 | Citro | H04N 19/176 382/233 |
| 2013/0304990 A1* | 11/2013 | Bass | G06F 12/0835 711/118 |
| 2014/0351811 A1* | 11/2014 | Kruglick | G06F 9/45558 718/1 |
| 2015/0052332 A1* | 2/2015 | Mortensen | G06F 15/7889 712/37 |
| 2015/0186158 A1* | 7/2015 | Yalamanchili | G06F 9/44505 713/100 |
| 2015/0205726 A1* | 7/2015 | Robatmili | G06F 12/0875 711/125 |
| 2015/0237356 A1* | 8/2015 | Wu | H04N 19/70 375/240.03 |

(Continued)

OTHER PUBLICATIONS

Xilinx, "Xilinx Answer 51950 Tandem PCIe Second Stage Bitstream Loading across the PCI Express Link," Sep. 12, 2013, p. 1-10, Xilinx, Inc., San Jose, California, USA.

(Continued)

*Primary Examiner* — Jaweed A Abbaszadeh
*Assistant Examiner* — Volvick Derose
(74) *Attorney, Agent, or Firm* — Kevin T. Cuenot

(57) ABSTRACT

Managing an accelerator may include responsive to determining a first container including a first configuration file and a second configuration file, caching, using a host processor, the second configuration file within a local memory of the host processor. The first configuration file may be provided, using the host processor, to a device of the accelerator. Responsive to a configuration event, the host processor may provide the cached second configuration file from the local memory to the device of the accelerator.

20 Claims, 6 Drawing Sheets

(56) References Cited

U.S. PATENT DOCUMENTS

| | | | | |
|---|---|---|---|---|
| 2016/0132441 A1* | 5/2016 | Styles | ............... | G06F 13/1689 |
| | | | | 710/110 |
| 2016/0210167 A1* | 7/2016 | Bolic | ............... | G06F 9/45558 |
| 2016/0306668 A1* | 10/2016 | Heil | ............... | G06F 9/5027 |
| 2017/0064313 A1* | 3/2017 | Wu | ............... | H04N 19/33 |
| 2017/0132163 A1* | 5/2017 | Aslot | ............... | G06F 3/0619 |

OTHER PUBLICATIONS

Xilinx, "Vivado Design Suite User Guide," UG909 (v2015.1), Apr. 1, 2015, pp. 1-100, Xilinx, Inc., San Jose, California, USA.

\* cited by examiner

BOOT AND CONFIGURATION MANAGEMENT FOR ACCELERATORS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to using accelerators and, more particularly, to boot and configuration management of accelerators using configuration files.

BACKGROUND

A data center includes many data processing systems, e.g., servers. The data processing systems may use accelerators to increase processing power and speed. Acceleration, or hardware acceleration, refers to the use of hardware to perform functions faster than is possible in software executing on a general-purpose central processing unit (CPU). Accelerators may include any of a variety of devices such as graphics processing units (GPUs), digital signal processors (DSPs), programmable integrated circuits (ICs), CPUs, or other specialized hardware. In many cases, the accelerators integrate with the data processing system via a communication bus. Peripheral Component Interconnect Express (PCIe) is one variety of communication bus that has found widespread usage in linking accelerators with data processing systems.

Typically, each different type of device that may be used in implementing an accelerator uses a different instruction set and/or different configuration files. In order to leverage the power of an accelerator, the data processing system, or "host system," executes a "heterogeneous application." A heterogeneous application is an application that may execute on a heterogeneous computing platform, i.e., a data processing system with one or more accelerators. An application written in Open Computing Language (OpenCL) is an example of a heterogeneous application where different portions of the application are designated to execute on different devices such as the host system or an accelerator coupled to the host system.

Often, the accelerators are initialized at boot time using configuration files. The configuration files are used to change the functionality of the devices of the accelerator. The configuration files, for example, may enable features in the accelerator and/or disable features of the accelerator. Typically, an accelerator must load more than one configuration file in order to boot or configure the accelerator. Often, there are special requirements relating to interdependencies among the configuration files that must be observed. For example, there may be a particular loading sequence requirement for the configuration files.

SUMMARY

A method of managing an accelerator includes, responsive to determining a first container including a first configuration file and a second configuration file, caching, using a host processor, the second configuration file within a local memory of the host processor. The method includes providing, using the host processor, the first configuration file to a device of the accelerator. The method further includes responsive to a configuration event, providing, using the host processor, the cached second configuration file from the local memory to the device of the accelerator.

A system includes a device, a local memory, and a host processor coupled to the local memory and the device. The host processor is configured to initiate executable operations. The executable operations include, responsive to determining a first container including a first configuration file and a second configuration file, caching the second configuration file within the local memory of the host processor and providing the first configuration file to the device over a communication link. The executable operations also include, responsive to a configuration event, providing the cached second configuration file from the local memory to the device over the communication link.

An integrated circuit (IC) includes programmable circuitry, a memory controller, and a processor coupled to the programmable circuitry and the memory controller. The processor is configured to initiate executable operations. The executable operations include, responsive to determining a first container including a first configuration file and a second configuration file, caching the second configuration file within a local memory of the processor using the memory controller. The executable operations include loading the first configuration file into the IC implementing circuitry using the programmable circuitry and, responsive to a configuration event, loading the cached second configuration file from the local memory into the IC.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
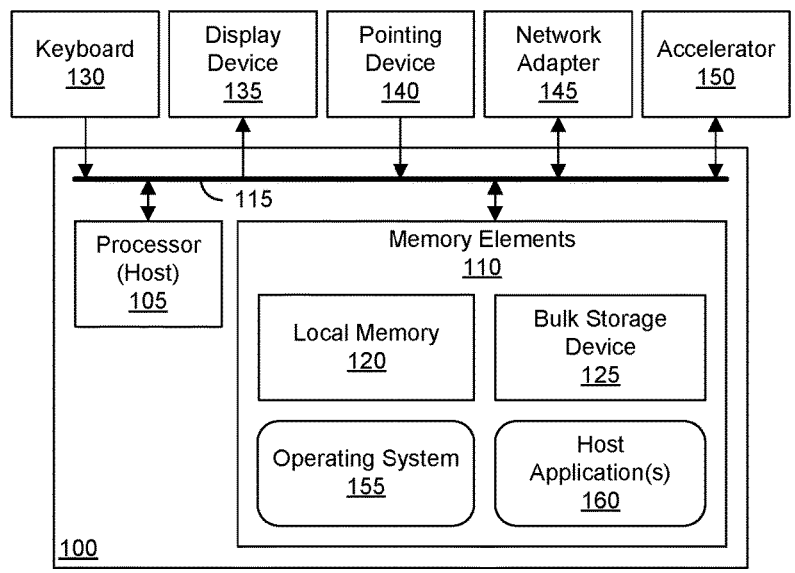
FIG. 1 is a diagram illustrating an example data processing system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to using accelerators and, more particularly, to boot and configuration management of accelerators using configuration files. In accordance with the inventive arrangements described herein, boot and configuration of an accelerator may be managed automatically by an accelerator driver executing in the host system. An accelerator may include one or more devices. Each device may require one or more different configuration files for operation. These configuration files often are be applied to devices of an accelerator in a particular sequence or order. Further complicating matters, a given data processing system may use more than one accelerator with each accelerator having one or more devices. Within the context of a large computing environment such as a data center, there may be many interconnected data processing systems with each using one or more accelerators. Boot and configuration management is an important technological aspect of using accelerators and ensuring that the accelerators operate efficiently and correctly.

In one example, an accelerator may include a programmable integrated circuit (IC). The programmable IC implements specialized circuitry by loading a type of configuration file called a configuration bitstream. In some programmable ICs, before the programmable IC may be reconfigured by loading a different configuration bitstream to implement different circuitry, a clearing configuration bitstream first must be loaded. The clearing configuration bitstream, however, must be one that is complementary, or a companion, to the configuration bitstream that is already loaded in the programmable IC. Tracking and managing the appropriate clearing configuration bitstreams for a given programmable IC of an accelerator may be onerous particularly since the programmable IC may be reconfigured at will by the host system with any of a variety of different configuration bitstreams depending upon the particular host application being executed.

A programmable IC is one type of device that may be used in an accelerator. Other examples of devices include graphics processing units (GPUs), digital signal processors (DSPs), central processing units (CPUs), and the like. Each of these different devices may have specialized configuration file requirements that may be tracked and managed automatically for purposes accelerator boot, recovery, and configuration (including reconfiguration). Boot and configuration procedures may differ markedly among accelerators and further differ across the different device types discussed above. Managing boot and configuration of accelerators automatically in the host system relieves user written applications executing on the host system from having to implement and/or oversee complex boot and configuration processes for the accelerators.

The inventive arrangements described herein may be implemented as a method or process performed by a data processing system and/or an IC. In another aspect, the inventive arrangements may be implemented as a data processing system and/or an IC having a processor and an accelerator or device. In still another aspect, the inventive arrangements may be implemented as a computer program product having a non-transitory computer-readable storage medium storing program code that, when executed, causes a processor to perform and/or initiate the operations described within this disclosure.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 is a block diagram illustrating an example data processing system (host system) 100. As pictured, host system 100 includes at least one processor, e.g., a CPU, 105 coupled to memory elements 110 through a system bus 115 or other suitable circuitry. Processor 105 is also referred to herein as the "host." Host system 100 stores computer readable instructions (also referred to as "program code") within memory elements 110. Memory elements 110 may be considered an example of computer readable storage media. Processor 105 executes the program code accessed from memory elements 110 via system bus 115. In one aspect, bus 115 may be a Peripheral Component Interconnect Express (PCIe) bus.

Memory elements 110 may include one or more physical memory devices such as, for example, a local memory 120 and one or more bulk storage devices 125. Local memory 120 refers to random access memory (RAM) or other non-persistent memory device(s) generally used during actual execution of the program code. Bulk storage device 125 may be implemented as a hard disk drive (HDD), solid state drive (SSD), flash memory, or other persistent data storage device. Host system 100 may also include one or more cache memories (not shown) that provide temporary storage of at least some program code in order to reduce the number of times program code is retrieved from bulk storage device 125 during execution.

Input/output (I/O) devices such as a keyboard 130, a display device 135, a pointing device 140, and one or more network adapters 145 may be coupled to host system 100. The I/O devices may be coupled to host system 100 either directly or through intervening I/O controllers. In some cases, one or more of the I/O devices may be combined as in the case where a touchscreen is used as display device 135. In that case, display device 135 may also implement keyboard 130 and pointing device 140. Network adapter 145 may be used to couple host system 100 to other systems, computer systems, remote printers, and/or remote storage devices through intervening private or public networks. Modems, cable modems, Ethernet cards, and wireless transceivers and/or radios are examples of different types of network adapter 145 that may be used with host system 100. Depending upon the particular implementation of host system 100, the specific type of network adapter, or network adapters as the case may be, will vary.

Host system 100 further is coupled to an accelerator 150. Accelerator 150 may include one or more devices. Example devices of accelerator 150 may include, but are not limited to, programmable ICs, GPUs, DSPs, CPUs, or any combination thereof. Accelerator 150 may perform operations using the device(s) and operate cooperatively with processor 105. For example, processor 105, in executing a host application, may invoke accelerator 150 to perform one or more tasks.

As pictured in FIG. 1, memory elements 110 may store an operating system 155 and one or more host applications 160. Host application 160, for example, is a user application that is executable by processor 105. Operating system 155 and host application 160, being implemented in the form of executable program code, are executed by host system 100 and, in particular, by processor 105. As such, operating system 155 and host application 160 may be considered an integrated part of host system 100. Operating system 155, host application 160, and any data items used, generated, and/or operated upon by host system 100 are functional data structures that impart functionality when utilized by host system 100 and/or when used by or implemented within a device of accelerator 150.

In one aspect, host system 100 may be a computer or other device that is suitable for storing and/or executing program code. Host system 100 may represent any of a variety of computer systems and/or devices that include a processor and memory and that are capable of performing the operations described within this disclosure. In some cases, the particular computer system and/or device may include fewer components or more components than described. Host system 100 may be implemented as a single system as shown or as a plurality of networked or interconnected systems each having an architecture the same as, or similar to, that of host system 100.

Figure 2:
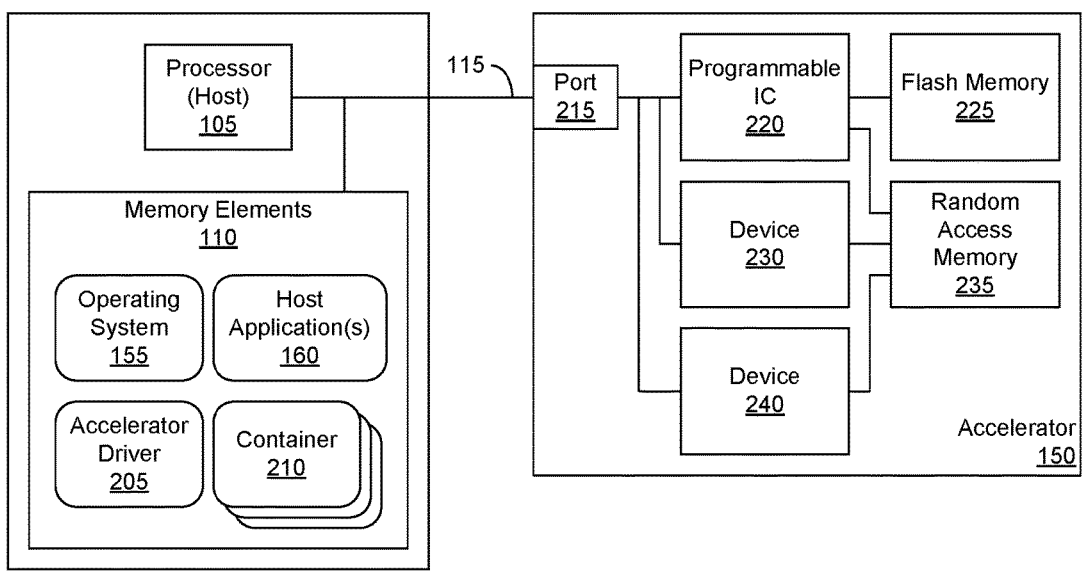
FIG. 2 is a diagram illustrating another aspect of the host system and accelerator of FIG. 1.

FIG. 2 is a diagram illustrating another aspect of host system 100 and accelerator 150 of FIG. 1. For purposes of illustration, not all of the various I/O devices described in FIG. 1 are shown in FIG. 2. Further, bulk storage device 125 and local memory 120 are not illustrated. Host system 100 stores an accelerator driver 205 and one or more containers 210 within memory elements 110.

Accelerator driver 205 may be executed by processor 105 to communicate with accelerator 150. In one aspect, accelerator driver 205 is implemented as a kernel mode device driver. The term "kernel mode" refers to a computing environment that includes high level privileges. A kernel mode device driver is made for, and executed using, the kernel mode of an operating system. Kernel mode device drivers generally execute at the same high level of privilege. By comparison, another kind of mode is "user mode." Drivers and programs that execute in the user mode have limited access and privileges.

In the kernel mode of an operating system, the program code that executes, i.e., a kernel mode device driver in this case, has complete and uninterrupted access to the hardware components of a system. A kernel mode device driver can execute any instruction that is required on the CPU, e.g., processor 105, without waiting. A kernel mode device driver is not dependent on system advance programming interfaces and can directly access the CPU without generating an interrupt call or waiting for a CPU task to be completed.

In addition, a kernel mode device driver can reference any memory address that is available. A kernel mode device driver can use any space available in the memory of the data processing system simply by referencing the memory location. Both the user mode and the kernel mode are implemented by the processor 105. Kernel mode device drivers typically are characterized by high performance due to the high level of privileges for the drivers. Kernel mode is also known as "system mode" with kernel mode drivers also being known as "system drivers."

Each of containers 210 stores one or more configuration files for devices of accelerator 150. Within this disclosure, the term "configuration file" is used to refer to firmware, microcode, or a configuration bitstream. Example types of configuration bitstreams include partial configuration bitstreams, full configuration bitstreams, and clearing configuration bitstreams. In addition to storing configuration files, each container 210 may also store an inventory of the configuration files and/or other files within the container, a description of devices or types of device for which the configuration files are intended to be used, and/or a description of the particular type of boot and/or configuration process used by the devices that the configuration files in the container are intended to support. A container may store one or more configuration files for a single device, for two or more devices, or for all devices of an accelerator such as accelerator 150.

In some varieties of programmable ICs, e.g., field programmable gate arrays (FPGAs), the use of a partial configuration bitstream requires a clearing configuration bitstream, also referred to as a "companion clearing configuration bitstream." For example, to load a particular partial configuration bitstream "B" into the programmable IC, the prior implemented partial configuration bitstream "A" within the programmable IC, or a portion thereof, must be cleared from the programmable IC. This requires that a clearing configuration bitstream that is specific to the partial configuration bitstream "A" first be loaded. The clearing configuration bitstream for the partial configuration bitstream A is referred to as the companion clearing configuration bitstream. Thus, only after loading the clearing configuration bitstream for the partial configuration bitstream A may partial configuration bitstream B be loaded.

In cases were many different partial configuration bitstreams are to be loaded into a programmable IC sequentially or in a dynamically determined (i.e., not predetermined) order, the companion clearing configuration bitstream for each partial configuration bitstream implemented within the programmable IC must first be loaded into the programmable IC before loading a next partial configuration bitstream into the programmable IC. These clearing configuration bitstreams must be tracked in order to locate and load the correct companion clearing configuration bitstream into the programmable IC at the correct time and under the correct circumstances.

In one arrangement, containers 210 may be used to support the tracking and management of the clearing configuration bitstreams. For example, a single container 210 may include a primary configuration file and a secondary configuration file. The primary configuration file may be a partial configuration bitstream. The secondary configuration file may be the companion clearing configuration bitstream for the primary configuration file.

As noted, containers 210 further may include a description indicating the type of boot process for which the configuration files of the container are compatible. A container 210, for example, may indicate whether the configuration files are for booting a device and, if so, the type of boot process. Referring to a programmable IC, example boot process types include partial reconfiguration and Tandem boot. Containers 210, for example, may be implemented as binary files the noted elements embedded or included therein.

In another aspect, a container may also include a pointer to another container. Using pointers, one or more containers 210 can be daisy chained or sequenced according to the pointers. Inclusion of a pointer within a container that points to another container may be used to provide configuration files for a multistage boot process for a device. The container ordering, as specified by the pointers, allows a particular sequencing of configuration files to be applied for one or more devices.

In a further aspect, a container may also include, or package, a user mode driver that may be used, e.g., executed, to communicate with an electronic design automation (EDA) runtime library used to implement accelerator driver 205. For example, the container may include a hardware abstraction layer (HAL) driver that may be used with runtime libraries incorporated into the host application. The runtime libraries may use the HAL driver. The HAL driver communicates with the accelerator driver to communicate with the device. The runtime libraries may find the HAL driver within the container, load the driver into memory, and use the HAL driver to communicate with the device via the accelerator driver. In one aspect, the embedded HAL driver may expose additional features of the hardware to the host or host application.

Containers may utilize one or more additional features including, but not limited to, a file format that may be versioned to support future enhancements to the container file structure and support backward compatibility. Containers may be signed and verified before being used by a device. Accelerator driver 205, for example, may be configured to enforce the signature matching of a container 210 with signatures obtained from the accelerator. Further, the content of containers 210 may be encrypted as is the case with other intellectual properties.

Example 1 illustrates a data structure that may be used to implement a container as described herein. The clearing configuration bitstream is referred to as the "clear bitstream" in Example 1. Accelerator driver 205 is configured to read the container data structure, determine contents of the container, determine and/or differentiate between different configuration files for different devices, determine configuration files for devices, and/or differentiate between a configuration file and a companion configuration file for a device.

Example 1

```
xclbin.h
#ifndef_XCLBIN_H_
#define_XCLBIN_H_
#if defined(_KERNEL_)
#include <linux/types.h>
#elif defined(_cplusplus)
#include <cstdlib>
#include <cstdint>
#else
#include _<stdlib.h>
#include <stdint.h>
#endif
#ifdef_cplusplus
extern "C" {
#endif
  /**
  * Container format for configuration files and metadata.
  * For segments not present both offset and length are 0 in
  the header.
  */
  struct xclBin {
    char m_magic[8]; /* should be xclbin0\0 */
    uint64_t m_length; /* total size of the container file */
    uint64_t m_timeStamp; /* number of seconds since epoch
    when container was created */
    uint64_t m_version; /* tool version used to create xclbin
    */
    unsigned m_flow; /*Tandem/Tandem+PR/PR */
    char m_nextXclBin[24]; /* Name of next container file in
    the daisy chain */
    uint64_t m_metadataOffset; /* file offset of embedded
    metadata */
    uint64_t m_metadataLength; /* size of the embedded
    metadata */
    uint64_t m_primaryFirmwareOffset; /* file offset of bit-
    stream or emulation archive */
    uint64_t m_primaryFirmwareLength; /* size of the bit-
    stream or emulation archive */
    uint64_t m_secondaryFirmwareOffset; /* file offset of
    clear bitstream if any */
    uint64_t m_secondaryFirmwareLength; /* size of the
    clear bitstream */
    uint64_t m_driverOffset; /* file offset of embedded device
    driver if any (currently unused) */
    uint64_t m_driverLength; /* size of the embedded device
    driver (currently unused) */
  };
#ifdef_cplusplus
}
#endif
#endif
```

Continuing with FIG. 2, bus 115 may be implemented as a PCIe bus. Accelerator 150 may be implemented as a card or printed circuit board having a port 215. Port 215 may be a PCIe port. Port 215 is coupled to a plurality of different devices via wires on the card or printed circuit board. It should be appreciated that accelerator 150 may be implemented with a single device, two devices, or more than three devices. The particular number of devices included in accelerator 150 is not intended as a limitation of the inventive arrangements described within this disclosure.

Port 215 is coupled to programmable IC 220, device 230, and device 240. Devices 230 and 240 are optional devices. In one arrangement, programmable IC 220 is an FPGA. In another arrangement, programmable IC 220 is a System-On-Chip (SOC) that includes programmable circuitry. Device 230 and device 240 may be implemented as programmable ICs, GPUs, DSPs, CPUs, or any combination thereof. As pictured, programmable IC 220 may be coupled to a flash memory 225 and a RAM 235. Flash memory 225 is configured to store a boot configuration file for programmable IC 220. RAM 235 is configured as runtime memory for programmable IC 220, device 230, and/or device 240.

As noted, one example of a programmable IC is an FPGA. An FPGA typically includes an array of programmable tiles. These programmable tiles may include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect circuitry and programmable logic circuitry. The programmable interconnect circuitry typically includes a large number of interconnect lines of varying lengths interconnected by programmable interconnect points (PIPs). The programmable logic circuitry implements the logic of a user design using programmable elements that may include, for example, function generators, registers, arithmetic logic, and so forth.

The programmable interconnect and programmable logic circuitries are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the complex programmable logic device, or CPLD. A CPLD includes two or more "function blocks" connected together and to input/output (I/O) resources by an interconnect switch matrix. Each function block of the CPLD includes a two-level AND/OR structure similar to those used in programmable logic arrays (PLAs) and programmable array logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits may be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices.

Programmable ICs may also be implemented in other ways, e.g., using fuse or antifuse technology. The phrase "programmable IC" may include, but is not limited to, these devices and further may encompass devices that are only partially programmable. For example, one type of programmable IC includes a combination of hard-coded transistor logic and a programmable switch fabric that programmably interconnects the hard-coded transistor logic. A programmable IC may include any IC, whether an application specific integrated circuit (ASIC), an SOC, or the like that includes programmable circuitry.

Figure 3:
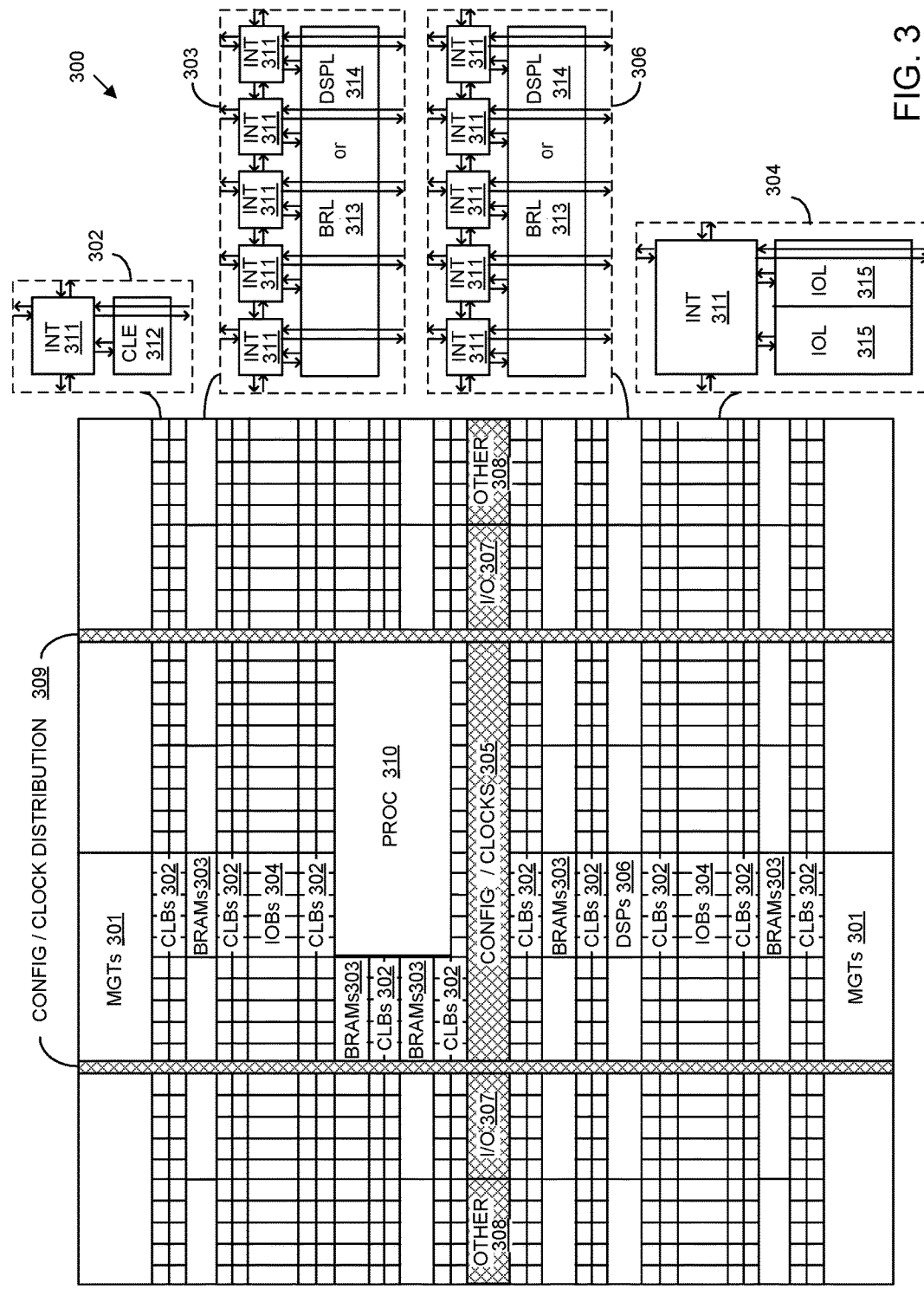
FIG. 3 is a block diagram illustrating an example architecture for an integrated circuit (IC).

FIG. 3 is a block diagram illustrating an example architecture 300 for an IC. In one aspect, architecture 100 may be implemented within a programmable IC such as programmable IC 220. For example, architecture 300 may be used to implement an FPGA. Architecture 300 may also be representative of an SOC type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 300 includes several different types of programmable circuit, e.g., logic, blocks. For example, architecture 300 may include a large number of different programmable tiles including multi-gigabit transceivers (MGTs) 301, configurable logic blocks (CLBs) 302, random access memory blocks (BRAMs) 103, input/output blocks (IOBs) 304, configuration and clocking logic (CONFIG/CLOCKS) 305, digital signal processing blocks (DSPs) 306, specialized I/O blocks 307 (e.g., configuration ports and clock ports), and other programmable logic 308 such as digital clock managers, analog-to-digital converters, system monitoring logic, and so forth.

In some ICs, each programmable tile includes a programmable interconnect element (INT) 311 having standardized connections to and from a corresponding INT 311 in each adjacent tile. Therefore, INTs 311, taken together, implement the programmable interconnect structure for the illustrated IC. Each INT 311 also includes the connections to and from the programmable logic element within the same tile, as shown by the examples included at the top of FIG. 3.

For example, a CLB 302 may include a configurable logic element (CLE) 312 that may be programmed to implement user logic plus a single INT 311. A BRAM 303 may include a BRAM logic element (BRL) 313 in addition to one or more INTs 311. Typically, the number of INTs 311 included in a tile depends on the height of the tile. As pictured, a BRAM tile has the same height as five CLBs, but other numbers (e.g., four) also may be used. A DSP tile 306 may include a DSP logic element (DSPL) 314 in addition to an appropriate number of INTs 311. An 10B 304 may include, for example, two instances of an I/O logic element (IOL) 315 in addition to one instance of an INT 311. The actual I/O pads connected to IOL 315 may not be confined to the area of IOL 315.

In the example pictured in FIG. 3, an area near the center of the die, e.g., formed of regions 305, 307, and 308, may be used for configuration, clock, and other control logic. Areas 309 extending from regions 305, 307, and 308 may be used to distribute the clocks and configuration signals across the breadth of the programmable IC.

Some ICs utilizing the architecture illustrated in FIG. 3 include additional logic blocks that disrupt the regular columnar structure making up a large part of the IC. The additional logic blocks may be programmable blocks and/or dedicated circuitry. For example, a processor block depicted as PROC 310 spans several columns of CLBs and BRAMs.

In one aspect, PROC 310 may be implemented as dedicated circuitry, e.g., as a hardwired processor, that is fabricated as part of the die that implements the programmable circuitry of the IC. PROC 310 may represent any of a variety of different processor types and/or systems ranging in complexity from an individual processor, e.g., a single core capable of executing program code, to an entire processor system having one or more cores, modules, co-processors, interfaces, or the like.

Figure 9:
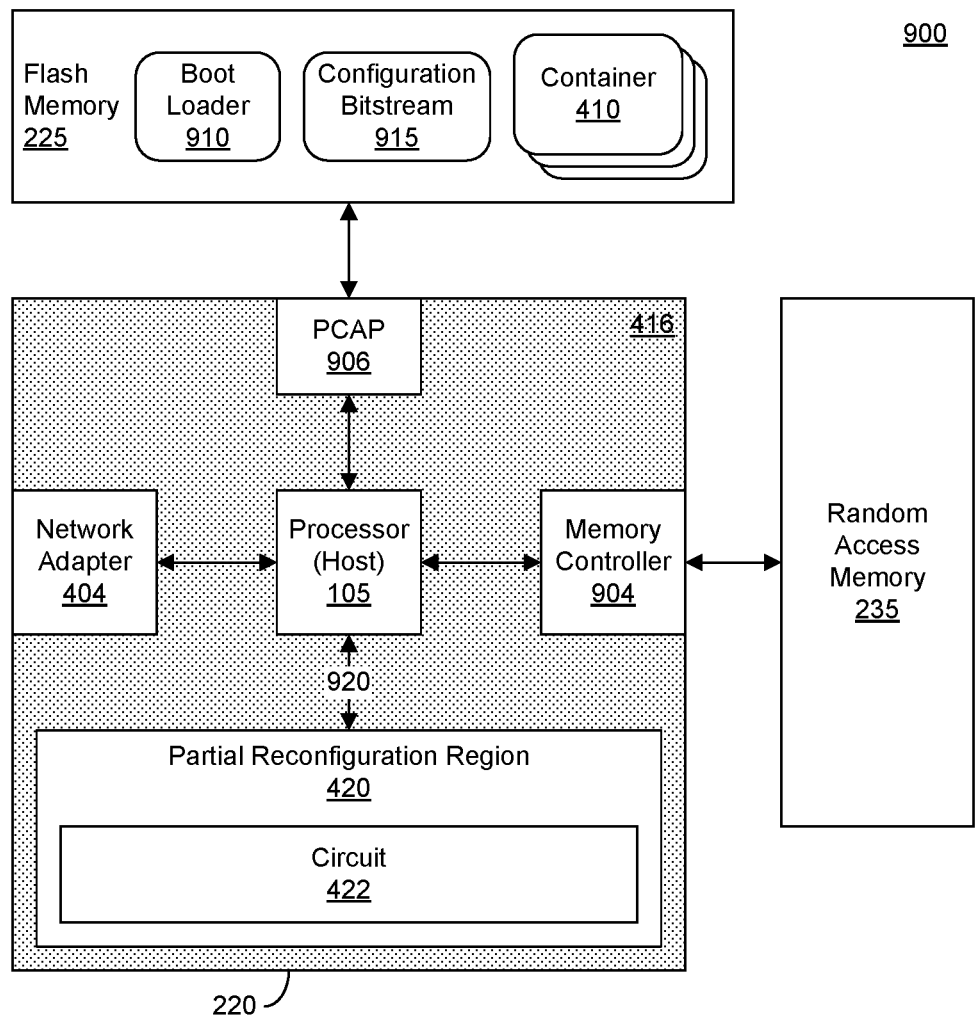
FIG. 9 is a block diagram illustrating another example of a host and an accelerator.

In one or more arrangements, PROC 310 may be used as a host processor. In such arrangements, the host is effectively integrated with the accelerator device. FIG. 9 illustrates an example where the host processor is included within the programmable IC and is programmed to perform the functions attributed to a host processor.

In another aspect, PROC 310 may be omitted from architecture 300 and replaced with one or more of the other varieties of the programmable blocks described. Further, such blocks may be utilized to form a "soft processor" in that the various blocks of programmable circuitry may be used to form a processor that can execute program code as is the case with PROC 310. In one or more arrangements, where the host processor is implemented on the programmable IC, the host processor may be implemented as a "soft processor" as described.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 3 that are external to PROC 310 such as CLBs 302 and BRAMs 303 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 310.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and/or program code that is to be executed by PROC 310 or a soft processor. In some cases, architecture 300 includes a dedicated configuration processor that loads the configuration bitstream to the appropriate configuration memory and/or processor memory. The dedicated configuration processor does not execute user-specified program code. In other cases, architecture 300 may utilize PROC 310 to receive the configuration bitstream, load the configuration bitstream into appropriate configuration memory, and/or extract program code for execution.

FIG. 3 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 3 are purely for illustration. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 310 within the IC are for purposes of illustration only and are not intended as limitations.

Figure 4:
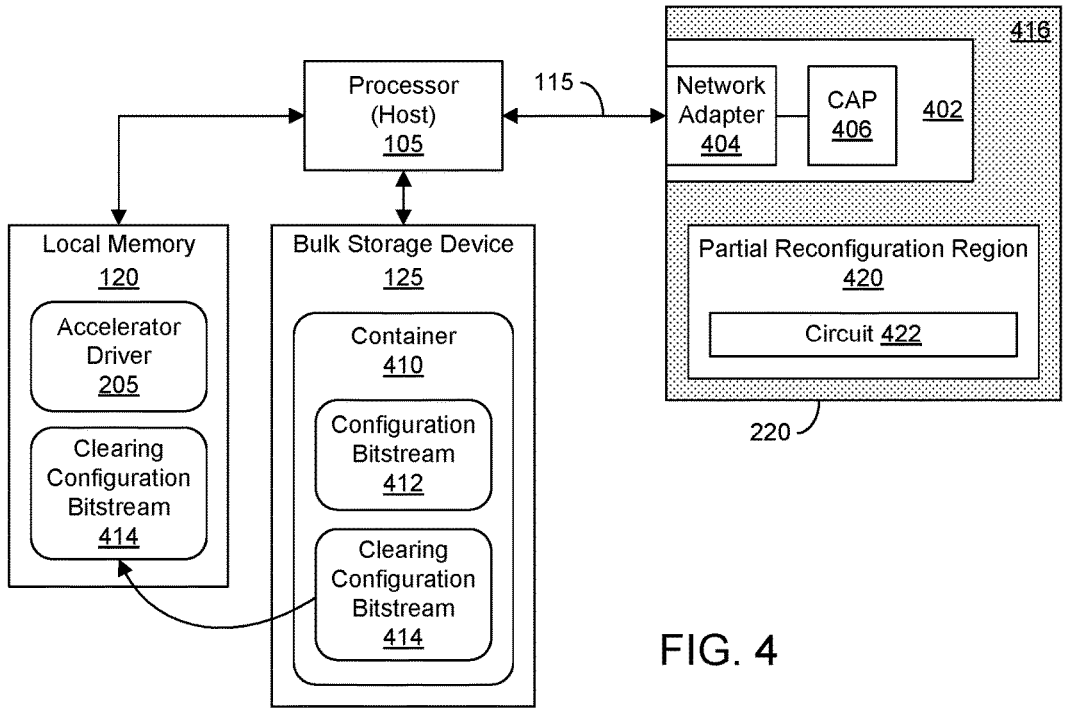
FIG. 4 is a diagram illustrating example operations performed by a host and an accelerator.

FIG. 4 is a diagram illustrating example operations performed by a host and an accelerator. As noted, processor 105 is considered the "host." For purposes of illustration, the entire accelerator 150 is not shown. Programmable IC 220 of accelerator 150 is shown. It should be appreciated that processor 105 is coupled to programmable IC 220 via port 215 and the wiring on accelerator 150.

FIG. 4 illustrates example operations performed as part of a boot process. In the example shown, host system 100 may be powered on. Powering on host system 100 may provide power to accelerator 150 (and to programmable IC 220) as a peripheral or device contained therein. In another arrangement, host system 100 may be powered on independently of accelerator 150. It should be appreciated, however, that accelerator 150 and host system 100 may be powered on at or about the same time and the boot process of each respective component may be coordinated with the other.

In one arrangement, a Tandem boot process may be used to boot programmable IC 220. A tandem boot process refers to a process where two partial configuration bitstreams are used to boot programmable IC 220. In the Tandem boot process, each frame of configuration memory cells of programmable IC 220 is written one time from loading both the first and the second partial configuration bitstreams. Portions written by the second partial configuration bitstream are not written by the first partial configuration bitstream.

In implementing the Tandem boot process, upon powering on, programmable IC 220 automatically accesses flash memory 225 (not shown) to obtain and load the first partial configuration bitstream (e.g., a first stage boot configuration bitstream). The hardwired circuitry of programmable IC 220, e.g., a configuration controller, is configured to access flash memory 225 and load the first partial configuration bitstream into configuration memory responsive to power on thereby implementing region 402 using programmable circuitry of programmable IC 220. While not shown, one skilled in the art will appreciate that the configuration controller stores the first partial configuration bitstream into appropriate configuration memory cells of programmable IC 220. The configuration controller is distinct from other processors that execute user program code. The configuration controller does not execute user program code, but rather is reserved exclusively for processing configuration bitstreams to implement circuit designs within programmable IC 220.

Region 402 includes a network adapter 404 coupled to a configuration access port (CAP) 406. Network adapter 404 may be a PCIe port. CAP 406 may be an internal configuration access port (ICAP) or a media configuration access port (MCAP). CAP 406 is a hardwired circuit block to which network adapter 404 is coupled. The first partial configuration bitstream loaded from flash memory 225 includes only the minimum configuration data needed to configure circuitry for programmable IC 220 to establish communication with processor 105 via bus 115, e.g., network adapter 404 coupled to CAP 406.

A second partial configuration bitstream is then loaded in a second stage of the Tandem boot process by processor 105 via the now implemented network adapter 404 of programmable IC 220. The second partial configuration bitstream completes the boot process by implementing the remainder of the circuitry. For example, as host system 100 is powered on, the operating system boots. Processor 105 may execute accelerator driver 205. Accelerator driver 205 locates container 410 at a predetermined location within bulk storage device 125 or within another data storage device coupled to host system 100. Within this disclosure, statements that the accelerator driver performs some operation mean that processor 105, in executing the accelerator driver, performs the operation.

Container 410 may include multiple configuration files. In the example of FIG. 4, container 410 includes a configuration bitstream 412 and a clearing configuration bitstream 414. In the Tandem boot case, configuration bitstream 412 is the second partial configuration bitstream, i.e., the second phase boot configuration bitstream. To complete the Tandem boot process of programmable IC 220, accelerator driver 205 loads configuration bitstream 412 into configuration memory of programmable IC 220 via network adapter 404 and CAP 406 to implement region 416. Region 416 includes or implements a partial reconfiguration region 420 that may be dynamically reconfigured. Responsive to loading configuration bitstream 412 into programmable IC 220, partial reconfiguration region 420 includes circuit 422.

In general, partial reconfiguration is a process where a region of a programmable IC, e.g., partial reconfiguration region 420, may be dynamically reconfigured by loading different partial configuration bitstreams during operation of programmable IC 220. Each of the partial configuration bitstreams, for example, may specify different circuitry and/or a different system than previously implemented in the region. The region may undergo modification through partial reconfiguration while other regions, i.e., region 402, of programmable IC 220 continue to operate without interruption.

Accelerator driver 205 reads clearing configuration bitstream 414 and loads, e.g., caches, clearing configuration bitstream 414 in local memory 120 for subsequent use. Clearing configuration bitstream 414 is a partial configuration bitstream that is loaded into programmable IC 220 to prepare partial reconfiguration region 420 before another partial configuration bitstream may be loaded into programmable IC 220 to implement different circuitry within partial reconfiguration region 420. Clearing configuration bitstream 414 is a companion clearing configuration bitstream to configuration bitstream 412. Container 410 packages the two complementary configuration files together in a single file.

In another arrangement, a partial reconfiguration boot process may be used to boot programmable IC 220. A partial reconfiguration boot process uses a full configuration bitstream followed by a partial configuration bitstream that overwrites portions of the configuration memory previously written by the full configuration bitstream. In using the partial reconfiguration boot process, responsive to power on, programmable IC 220 obtains a full configuration bitstream from flash memory 225 and loads the full configuration bitstream into configuration memory of programmable IC 220 in a first stage of the partial reconfiguration boot process.

The full configuration bitstream implements region 402 in programmable IC 220. Whereas the partial configuration bitstream in Tandem boot for the first stage only writes to those configuration memory cells needed to implement region 402, the full configuration bitstream used for partial configuration writes to the configuration memory for the entirety of programmable IC 220 (e.g., for both region 402 and region 416). The portion of the full configuration bitstream written to configuration memory cells for region 416, however, are zeroes to speed up implementation of network adapter 404. Thus, no other circuitry is actually implemented in region 416 despite writing to the configuration memory cells for the region.

As host system 100 is powered on, the operating system boots. Processor 105 may execute accelerator driver 205 and locate container 410 at a predetermined location within bulk storage device 125 or within another data storage device coupled to host system 100. Container 410 may include multiple configuration files as described. In the case of a partial reconfiguration boot process, configuration bitstream 412 is a partial configuration bitstream that implements region 416 including partial reconfiguration region 420. Whereas in the tandem boot process the configuration memory cells for region 416 were not originally written, in the partial reconfiguration boot case, the configuration memory cells for region 416 were written with zero values and are overwritten with configuration bitstream 412 during the second phase of the boot process. To complete the partial reconfiguration boot process, accelerator driver 205 loads configuration bitstream 412 into configuration memory of programmable IC 220 via network adapter 404 and CAP 406 to implement region 416. Responsive to loading configuration bitstream 412, partial reconfiguration region 420 includes circuit 422.

Accelerator driver 205 further reads clearing configuration bitstream 414 and loads, e.g., caches, clearing configuration bitstream 414 in local memory 120 for subsequent use. Clearing configuration bitstream is a partial configuration bitstream that is loaded to prepare partial reconfiguration region 420 before another partial configuration bitstream may be loaded into programmable IC 220 to implement different circuitry within partial reconfiguration region 420. Clearing configuration bitstream 414 is a companion clearing configuration bitstream to configuration bitstream 412. Container 410 packages the two complementary configuration files together in a single file.

Figure 5:
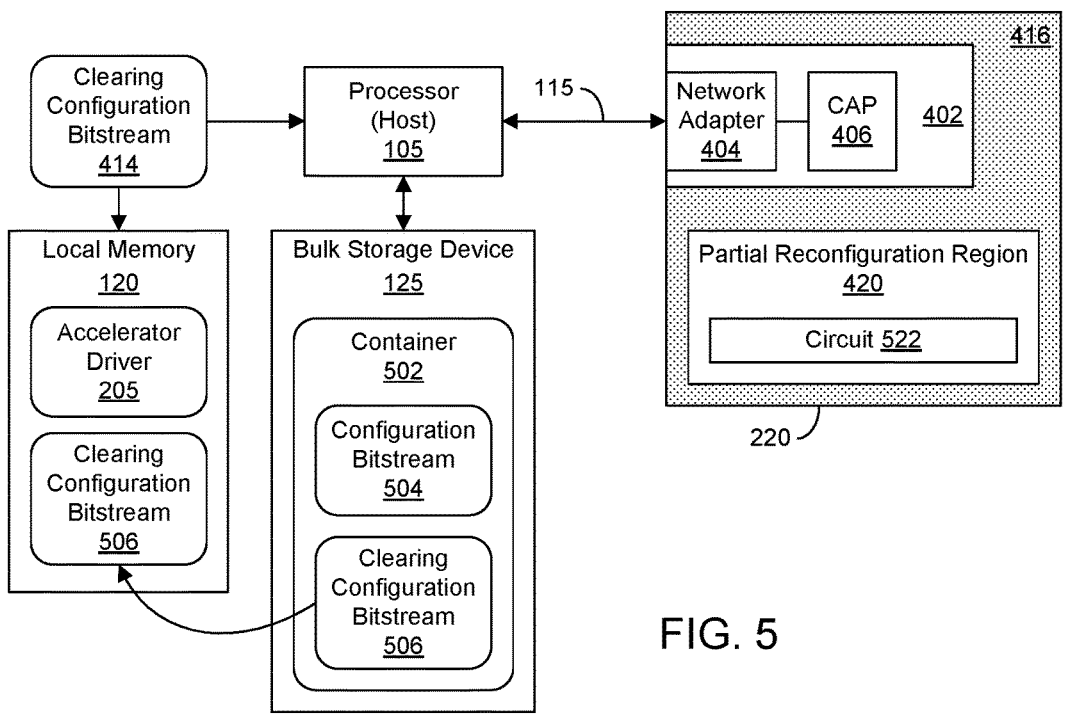
FIG. 5 is a diagram illustrating further example operations performed by a host and an accelerator.

FIG. 5 is a diagram illustrating further example operations performed by a host and an accelerator. For purposes of illustration, only programmable IC 220 of accelerator 150 is shown. FIG. 5 illustrates operations performed by host system 100 and programmable IC 220 that may follow a Tandem boot process or a partial reconfiguration boot process. In the example of FIG. 5, accelerator driver 205 determines that configuration of programmable IC 220 is requested.

Accordingly, accelerator driver 205 locates the particular container needed to implement the specialized circuitry (i.e., circuit 522) for the task within partial reconfiguration region 420. In this case, accelerator driver 205 locates container 502. Accelerator driver 205 prepares programmable IC 220 for dynamic partial reconfiguration by sending clearing configuration bitstream 414 from local memory 120 to programmable IC 220 via network adapter 404. Clearing configuration bitstream 414 clears partial reconfiguration region 420 (e.g., clearing circuit 422). Accelerator driver 205 further reads configuration bitstream 504 from container 502 and sends configuration bitstream 504 to programmable IC 220 via network adapter 404 thereby implementing circuit 522 within partial reconfiguration region 420. Accelerator driver 205 further reads clearing configuration bitstream 506 from container 502 and stores, or caches, clearing configuration bitstream 506 in local memory 120 for subsequent use. Processor 105 may delete clearing configuration bitstream 414 or overwrite clearing configuration bitstream 414 with clearing configuration bitstream 506. Clearing configuration bitstream 506 is a companion clearing configuration bitstream for configuration bitstream 504.

Figure 6:
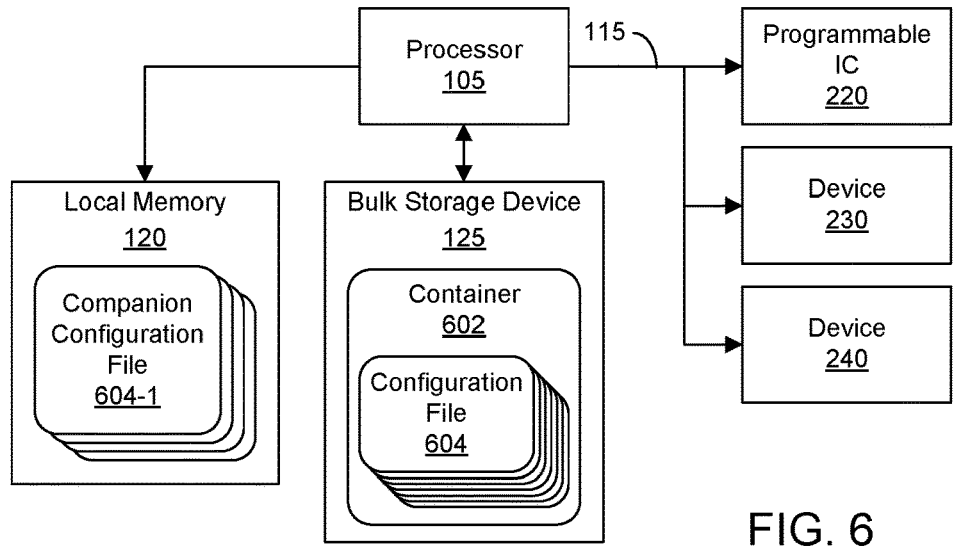
FIG. 6 is a diagram illustrating an example where a container stores configuration files for multiple different devices.

FIG. 6 is a diagram illustrating an example where a container stores configuration files for multiple different devices. In the example of FIG. 6, accelerator driver 205 locates a container 602. Container 602 may include a plurality of different configuration files 604. Configuration files 604 may include one or more pairs of configuration files and companion configuration files 604-1. As noted, a configuration bitstream may have a companion clearing configuration bitstream.

Container 602 includes one or more configuration files 604 for each of programmable IC 220, device 230, and device 240. As discussed, depending upon the particular device, the configuration file may be firmware, microcode, or a configuration bitstream. For those devices that utilize a companion configuration file, accelerator driver 205 stores the companion configuration files 604-1 within local memory 120 for the various ones of configuration files 604 provided to programmable IC 220, device 230, and device 240.

FIG. 6 illustrates a case where the configuration files 604 needed to boot and/or reconfigure an accelerator having multiple different devices may be stored in a single file that may be accessed by the host. For example, in the event that new configuration files are to be added or loaded into the accelerator, the host system need only load the new container, e.g., container 602, which may be used to boot, configure, and/or reconfigure each different device of the accelerator. Further, any necessary companion configuration files for devices, obtained from container 602, are cached and available for the appropriate devices when needed.

Figure 7:
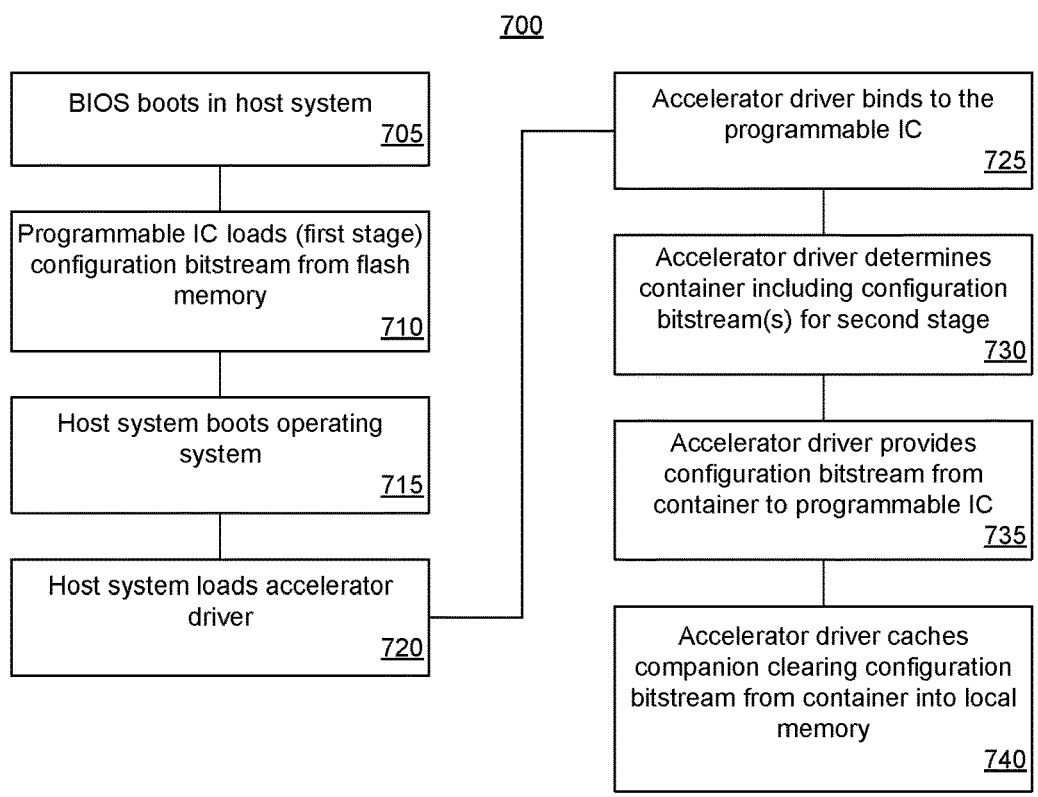
FIG. 7 is a flow chart illustrating an example method of booting a host and an accelerator that includes a programmable IC.

FIG. 7 is a flow chart illustrating an example method 700 of booting a host and an accelerator that includes a programmable IC. Method 700 may be used to support flows where a user, using an electronic design automation (EDA) tool, creates one or more partial configuration bitstreams for implementation within a programmable IC and packages the partial configuration bitstreams in a container as described herein. When a system is operational, end users may wish to load a different container that includes a particular configuration bitstream for a specific circuit and/or function to be offloaded from a processor. Using the techniques described herein, the partial configuration bitstreams, as packaged into containers, may be installed into a system and used to boot devices. The containers may be loaded in any order.

In block 705, the BIOS of host system boots. In block 710, the programmable IC, responsive to being powered on, loads the first configuration bitstream from flash memory. The programmable IC, as described, is part of an accelerator coupled to the host system. The first configuration bitstream is loaded as part of a first stage of either a Tandem boot process or a partial reconfiguration boot process. In either case, the network adapter of the programmable IC is active responsive to loading the first configuration bitstream from flash memory.

In block 715, the host system boots the operating system. In block 720, the host system loads the accelerator driver. As noted, the accelerator driver may be a kernel mode device driver. In one aspect, the accelerator driver is automatically loaded by the operating system as a part of a standard device discovery mechanism. The accelerator driver is configured to automatically discover the container including the configuration bitstream for the second stage of the boot process and to download the configuration bitstream at boot time for the operating system of the host system to the programmable IC.

In block 720, the accelerator driver binds to the programmable IC. The accelerator driver binds to the programmable IC automatically. The accelerator driver binds to the programmable IC via the network adapter implemented in the programmable IC from the first configuration bitstream. In one arrangement, as part of binding to the programmable IC, the accelerator driver queries the programmable IC for a device type and/or for a type of boot process.

In block 730, the accelerator driver determines the container that includes the configuration bitstream(s) for the second stage of the boot process for the programmable IC. In one aspect, the accelerator driver may use received information, e.g., device type and/or type of boot process, from the programmable IC to locate the correct container. The container that includes the configuration bitstream(s) for the second stage of the boot process may be located in a predetermined memory location within the host system or within another data storage device coupled to the host system.

In one arrangement, the accelerator driver configures the programmable IC like a standard PCIe device. The accelerator driver automatically locates and loads the container including the configuration bitstream needed to implement the second phase of the boot process for the programmable IC. For purposes of illustration, consider a host system with a Linux type of operating system. The accelerator driver may use the standard request_firmware( ) kernel application programming interface (API) to find and load the container containing the configuration bitstream(s) for the second stage of the boot process for the programmable IC. The container may be found in the standard firmware directories of the operating system. Referring again to a Linux type operating system, the container may be located in the /lib/firmware directory. As noted, if multiple containers are located in the directory, attributes such as device type and type of boot process obtained by querying the programmable IC may be used by the accelerator driver to select the correct container.

In one aspect, the accelerator driver may provide a standard ioctl( ) system call interface to the HAL (user mode) driver for loading partial configuration bitstreams to the programmable IC via the bus. For example, the host application may include a runtime library that is invoked to load a container in response to an event requiring the ability to load a partial configuration bitstream into the programmable IC dynamically. The ioctl( ) system call interface allows passing of a buffer containing a container from the user memory space to the operating system memory space of the host system.

In block 735, the accelerator driver provides the configuration bitstream, from the container, to the programmable IC. The accelerator driver, for example, is configured to read the contents of the container and differentiate between the various configuration bitstreams included therein. The accelerator driver, for example, automatically provides the configuration bitstream to the programmable IC responsive to block 730. Further, the accelerator driver may perform the operations described herein in real time. The accelerator driver sends the configuration bitstream to the programmable IC via the bus and network adapter of the programmable IC. The bus, as noted, may be a PCIe bus. The configuration bitstream is a partial configuration bitstream for completing the second phase of the boot process.

In loading the partial configuration bitstream into the programmable IC, the remaining circuitry, which may include a partial reconfiguration region, is implemented in the programmable IC. The programmable IC is operational and available for performing tasks using the newly implemented circuitry under control of, or responsive to requests from, the host system (i.e., the host processor).

In block 740, the accelerator driver caches the companion clearing configuration bitstream from the container (for the configuration bitstream provided to the programmable IC in block 735) into local memory for subsequent use. The accelerator driver, as noted, may recognize and differentiate the companion clearing configuration bitstream from the other configuration bitstream within the container. Further, the accelerator driver determines that the two configuration bitstreams are companions (e.g., related). As discussed, before the accelerator driver is able to load another partial configuration bitstream into the programmable IC to implement new and/or different circuitry within the partial reconfiguration region, the accelerator driver first provides the cached companion clearing configuration bitstream to the programmable IC.

For example, responsive to the accelerator driver receiving a buffer pointer to a container via the ioctl( ) system call from a host application, the accelerator driver extracts the companion clearing configuration bitstream from the container and caches a copy of the companion clearing configuration bitstream in the local memory allocated to the accelerator driver. The local memory for the accelerator driver may be dynamically allocated and/or deallocated.

Figure 8:
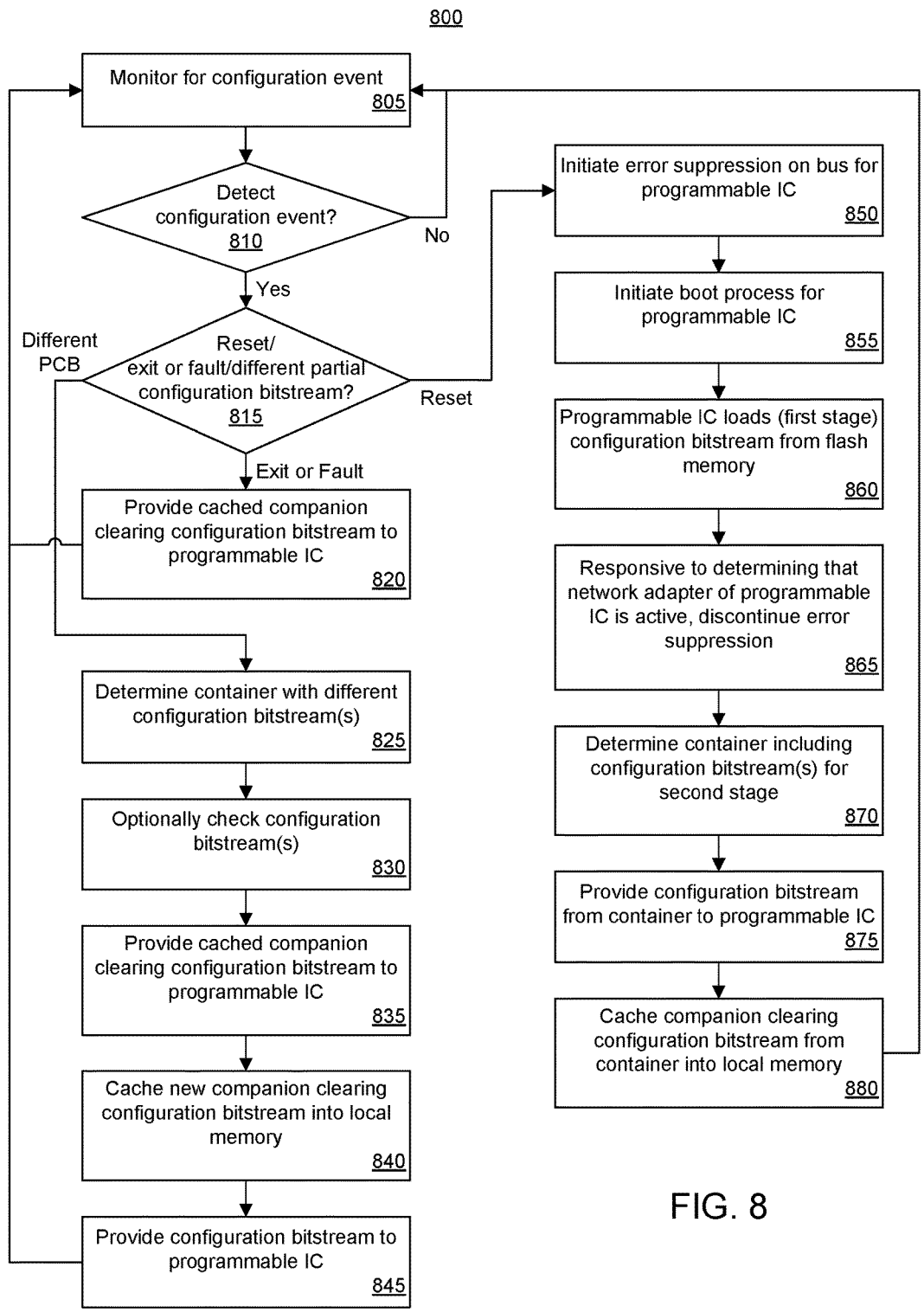
FIG. 8 is a flow chart illustrating another example method of operation for a host and an accelerator that includes a programmable IC.

FIG. 8 is a flow chart illustrating another example method 800 of operation for a host system and an accelerator that includes a programmable IC. Method 800 may be used to support flows where a user, using an EDA tool, creates one or more partial configuration bitstreams for implementation within a programmable IC and packages the partial configuration bitstreams in a container as described herein. Using the techniques described herein, the partial configuration bitstreams may be loaded in any order.

Method 800 may begin in a state where the programmable IC has been booted and is operating as a device on the bus of the host system. The programmable IC, for example, may be operating as a device on the bus. As noted, the bus may be a PCIe bus and, in that case, the programmable IC is a PCIe device. The accelerator driver is loaded and bound to the programmable IC. The various operations described with reference to FIG. 8 and attributed to the accelerator driver may be performed automatically and/or in real time.

Method 800 also begins in a state where the programmable IC has circuitry implemented therein within the partial reconfiguration region. The companion clearing configuration bitstream for the partial configuration bitstream loaded into the programmable IC is cached in memory of the host system. For purposes of discussion, the partial configuration bitstream already implemented in the programmable IC is referred to as PCB-A. The companion clearing configuration bitstream for PCB-A cached in local memory of the host system is referred to as CCB-A.

In block 805, the accelerator driver monitors for a configuration event. The configuration event may be any of a variety of events that cause some type of configuration of a device of the hardware accelerator. For example, a configuration event may be a request to load a different partial configuration bitstream into a partial reconfiguration region of the programmable IC, an exit (e.g., completion of processing) or a fault of a host application, an error necessitating a reset of the programmable IC, or the like.

In block 810, the accelerator driver determines whether a configuration event is detected. If so, method 800 continues to block 815. If not, method 800 loops back to block 805 to continue monitoring for a configuration event.

In block 815, the accelerator driver determines the type of configuration event that is detected. As noted, the configuration event may be a request to load a different partial configuration bitstream, an exit of the host application, a fault of the host application, or a reset of the programmable IC. If the configuration event is an exit or fault of the host application (shown as "exit or fault"), method 800 continues to block 820. If the configuration event is a request to load a different partial configuration bitstream (shown as "different PCB"), method 800 continues to block 825. If the configuration event is a reset of the programmable IC (shown as "reset"), method 800 continues to block 850.

Proceeding with block 820 in the case of an exit or fault of the host application, the accelerator driver provides the cached companion clearing configuration bitstream to the programmable IC. The accelerator driver may send the cached companion clearing configuration bitstream to the programmable IC via the bus. The accelerator driver may detect an exit or fault of the host application and, in response thereto, automatically send CCB-A to the programmable IC. Further, the accelerator driver may automatically may free the memory allocated to storing CCB-A for caching purposes. Loading CCB-A into the programmable IC may be used to clear the circuitry responsive to completion of execution (e.g., exit) of the host application that requested implementation of PCB-A or responsive to a detected fault of the host application that requested implementation of PCB-A.

Loading PCB-A, or any other companion clearing configuration bitstream, into the programmable IC does not render the programmable IC inoperable. The circuitry of the programmable IC, with the exception of the partial reconfiguration region, continue to operate. This allows the host system to maintain the communication link through the bus with the programmable IC as an active communication channel. The programmable IC, however, may not be configured for performing specific tasks delegated by the host system until the programmable IC is loaded with a further partial configuration bitstream. After block 820, method 800 loops back to block 805.

Proceeding with block 825 in the case where a different partial configuration bitstream is to be loaded, the accelerator driver determines that a different container is to be used to load the programmable IC. For example, the accelerator driver may determine that a same host application is attempting to load a second (or different) container via the ioctl( ) after finishing with a first container. For purposes of discussion, the second (or different container) may include a different partial configuration bitstream referred to as PCB-B and a companion clearing configuration bitstream for PCB-B referred to as CCB-B.

In another aspect, the accelerator driver may determine that the accelerator is not in active use by a host application. In that case, the PCB-B of the container determined in block 825 may be a partial configuration bitstream that places the programmable IC into a low power mode. For example, PCB-B may place the programmable circuitry in the partial reconfiguration region in a low power state where the programmable circuitry is not used. It should be appreciated that despite implementing a low power partial configuration bitstream, the communication link between the programmable IC and the host system is maintained by the network adapter in region 402 of the programmable IC. This low power mode reduces power consumption of the accelerator by increasing the performance per watt during periods where the accelerator (programmable IC) is idle or not actively in use.

In block 830, the accelerator driver optionally checks the configuration bitstream(s) of the container. For example, the accelerator driver may perform a sanity check on PCB-B. For purposes of discussion, the PCB-B is presumed to pass the check. It should be appreciated that should the check fail, the accelerator driver may invoke one or more error recovery techniques including the exit or fault operations described with reference to block 820. In another aspect, responsive to a failed check, the accelerator driver may return an error to the host application and/or a message that the specified container is not available.

In block 835, the accelerator driver provides CCB-A to the programmable IC. The accelerator driver sends CCB-A to the programmable IC via the bus and the network adapter of the programmable IC. The programmable IC loads CCB-A into configuration memory thereby preparing the partial reconfiguration region for implementation of new and/or different circuitry.

In block 840, the accelerator driver caches CCB-B from the container into local memory of the host system allocated to the accelerator driver thereby caching CCB-B for subsequent use. For example, the accelerator driver may receive a buffer pointer to the container via the ioctl( ) system call from a host application. In response, the accelerator driver extracts the companion clearing configuration bitstream (CCB-B) from the container and caches a copy in memory allocated to the accelerator driver. The memory for the accelerator driver may be dynamically allocated and/or deallocated as noted.

In block 845, the accelerator driver provides PCB-B to the programmable IC. The accelerator driver may send PCB-B to the programmable IC via the bus and the network adapter of the programmable IC. The programmable IC loads PCB-B into configuration memory thereby implementing the new and/or different circuitry within the partial reconfiguration region of the programmable IC. Subsequent to implementing block 845, the programmable IC is operational and available for performing tasks using the newly implemented circuitry under control of, or responsive to requests from, the host system (i.e., the host processor). After block 845, method 800 may loop back to block 805 to continue processing.

As noted, in the case where the configuration event is a reset of the programmable IC, method 800 continues to block 850. In block 850, the accelerator driver initiates error suppression of the bus for the programmable IC. Error suppression is necessary since resetting the entire programmable IC brings down the network adapter and bus connection between the programmable IC and the host system for a small amount of time that may exceed allowable disruptions in communications for a bus such as a PCIe bus.

In one arrangement, the circuit board (e.g., mother board) to which the host is coupled may include additional circuitry for the port. For example, a card connector or the like may include additional circuitry that masks particular errors on the bus that may be generated while the programmable IC is reset and unable to communicate on the bus. The additional circuitry may begin masking the errors responsive to a request from the accelerator driver to initiate error suppression in order to reset the programmable IC.

In block 855, the accelerator driver initiates a boot process for the programmable IC via the bus and network adapter of the programmable IC. In block 860, the programmable IC, responsive to the instruction from the accelerator driver, loads a first stage configuration bitstream from the flash memory. The first stage configuration bitstream may be for either a Tandem boot process or a reconfiguration boot process as previously described. While loading the first stage configuration bitstream from the flash memory, the network adapter is unavailable until the first stage configuration bitstream is fully loaded thereby re-implementing region 402 as previously described with the programmable IC.

In block 865, responsive to determining that the network adapter of the programmable IC is active, the accelerator driver discontinues error suppression. The accelerator driver, for example, may instruct the circuitry to stop suppressing errors (signals) on the bus from the programmable IC.

In block 870, the accelerator driver determines the container that includes the configuration bitstream(s) for the second stage of the boot process for the programmable IC. The accelerator driver may determine the container as previously described. In one aspect, for example, the accelerator driver may select the container automatically from a default location. In another example, the accelerator driver may communicate with the programmable IC via the network adapter implemented therein via the bus to determine a type of device and/or a type of boot process to be used. The accelerator driver may use the received information to select one of a plurality of containers available for the second stage of the boot process for the programmable IC.

In block 875, the accelerator driver provides the configuration bitstream from the container to the programmable IC. The accelerator driver sends the configuration bitstream to the programmable IC via the bus and network adapter implemented within the programmable IC. The configuration bitstream is a partial configuration bitstream for completing the second phase of the boot process. In loading the partial configuration bitstream into the programmable IC, the remaining circuitry, which may be implemented in the partial reconfiguration region, is implemented in the programmable IC. Subsequent to block 875, the programmable IC is operational and available for performing tasks using the newly implemented circuitry under control of, or responsive to requests from, the host system (i.e., the host processor). In one arrangement, the programmable IC may be further reconfigured by looping back to block 805 and continuing through blocks 810, 815, and on to block 825 to load a different partial configuration bitstream.

In block 880, the accelerator driver caches the companion clearing configuration bitstream for the configuration bitstream provided to the programmable IC in block 875 into local memory for subsequent use. As discussed, before another partial configuration bitstream may be loaded into the programmable IC to implement new and/or different circuitry within the partial reconfiguration region, the cached companion clearing configuration bitstream first is provided by the accelerator driver to the programmable IC.

Referring to FIGS. 7 and 8, the methods described herein may be used to remotely and automatically update configuration files of devices throughout a computing environment such as a data center. A system administrator, for example, may create a container or containers for accelerators with updated configuration files and store the containers within the host system(s) in designated locations. The next reboot of the host system and/or the accelerator(s) will cause the container(s) with the update configuration files to be used in booting the accelerator(s) and devices thereon throughout the data center.

FIG. 9 is a block diagram illustrating another example of a host and an accelerator. In the example of FIG. 9, the host is included in the accelerator or on the same device (e.g., programmable IC 220) as the accelerator. As pictured, system 900 includes programmable IC 220 coupled to flash memory 225 and RAM 235. System 900 may or may not include other devices. Programmable IC 220 includes processor 105, a memory controller 904, and a processor configuration access port (PCAP) 906.

In one arrangement, processor 105 is a hardwired processor. In another arrangement, processor 105 is a soft processor. Hard and soft processors are described with reference to the architecture illustrated in FIG. 3. Processor 105 may operate as a host processor within a heterogeneous system. Processor 105 is coupled to PCAP 906. PCAP 906 is a hardwired circuit block. PCAP 906 is configured to access an external memory and provide an interface for processor 105 to the external memory. In the example of FIG. 9, PCAP 906 is an interface between processor 105 and flash memory 225.

Flash memory 225 may store a boot loader 910, a configuration bitstream 915, and one or more containers 210. In one arrangement, responsive to powering on programmable IC 220, PCAP 906 may read flash memory 225 and provide boot loader 910 to processor 105. Processor 105, for example, is a hardwired processor. Processor 105 may execute boot loader 910 to begin operation. Responsive to executing boot loader 910, processor 105, using PCAP 906, loads configuration bitstream 915 into configuration memory cells (not shown) of programmable IC 220. Configuration bitstream 915 is a first stage boot configuration bitstream. Configuration bitstream 915 may be a partial configuration bitstream in the case of a Tandem boot process or may be a full configuration bitstream in the case where partial reconfiguration is used as the boot process.

In one arrangement, configuration bitstream 915, when loaded into programmable IC 220, may implement network adapter 404 using programmable circuitry of programmable IC 220. Network adapter 404 may be coupled to processor 105. In one aspect, network adapter 404 may be used to allow programmable IC 220, using processor 105, to communicate with one or more other systems. In this regard, programmable IC 220 may receive further containers, instructions, and/or date via network adapter 404. In the example of FIG. 9, network adapter 404 is optional and may be omitted.

In another arrangement, configuration bitstream 915, when loaded into programmable IC 220, may implement memory controller 904 using programmable circuitry of programmable IC 220. Memory controller 904 communicates with RAM 235. Processor 105 is coupled to memory controller 904 to access, e.g., read and/or write, RAM 235.

In another arrangement, memory controller 904 may be a hardwired circuit block. In that case, memory controller 904 is not implemented by configuration bitstream 915. It should be appreciated, however, that boot loader 910 and/or configuration bitstream 915 may include configuration settings that may be used to initialize memory controller 904 for use with particular types of RAM in the case where memory controller 904 is a hardwired circuit block of programmable IC 220.

In any case, configuration bitstream 915, when loaded into configuration memory cells of programmable IC 220, may include only the minimum configuration data needed to configure circuitry for programmable IC 220 to establish communication with processor 105 through one or more communication ports 920 and for processor 105 to access RAM 235.

With processor 105 booted and memory controller 904 operational, programmable IC 220 may operate as described within this disclosure with the exception that processor 105 is located on-chip as part of the accelerator. Flash memory 225 may be used, or function, as bulk storage device 125 storing containers. RAM 235 may be used, or function, as local memory 120 storing an accelerator driver 205 and clearing configuration bitstreams. In the example of FIG. 9, region 416, the programmable circuitry of programmable IC 220, and/or partial reconfiguration region 420 may be considered the "device" of an accelerator or "the accelerator" that operates under control of (host) processor 105.

In the case of a Tandem boot process, a second partial configuration bitstream may then be loaded in a second stage by processor 105 via PCAP 906. The second partial configuration bitstream completes the boot process by implementing the remainder of the circuitry. For example, processor 105 may execute an operating system and the accelerator driver upon executing boot loader 910. The accelerator driver locates container 410 at a predetermined location within flash memory 225 or within another data storage device coupled to programmable IC 220, i.e., via network adapter 404.

Container 410 may include multiple configuration files. In the example of FIG. 9, container 410 includes a configuration bitstream and a clearing configuration bitstream. In the Tandem boot case, the configuration bitstream is the second partial configuration bitstream, i.e., the second phase boot configuration bitstream. To complete the Tandem boot process of programmable IC 220, the accelerator driver loads the configuration bitstream from container 410 into configuration memory of programmable IC 220 via PCAP 906 to implement region 416. Region 416 includes or implements partial reconfiguration region 420 that may be dynamically reconfigured. Responsive to loading the configuration bitstream from container 410 into programmable IC 220, partial reconfiguration region 420 includes circuit 422.

The accelerator driver reads clearing configuration bitstream from container 410 and loads, e.g., caches, the clearing configuration bitstream in RAM 235 for subsequent use using memory controller 904. The clearing configuration bitstream is a partial configuration bitstream that is loaded into programmable IC 220 to prepare partial reconfiguration region 420 before another partial configuration bitstream may be loaded into programmable IC 220 to implement different circuitry within partial reconfiguration region 420. The clearing configuration bitstream is a companion clearing configuration bitstream to the configuration bitstream previously loaded from container 410. Container 410 packages the two complementary configuration files together in a single file.

In the case of a partial reconfiguration boot process, as noted, a full configuration bitstream is used as the first stage boot configuration bitstream followed by a partial configuration bitstream that overwrites portions of the configuration memory previously written by the full configuration bitstream. Accordingly, processor 105, in executing the accelerator driver, locates container 410 at a predetermined location within flash memory 225 or within another data storage device coupled to programmable IC 220 via network adapter 404. Container 410 may include multiple configuration files as described. In the case of a partial reconfiguration boot process, the second stage configuration bitstream read from container 410 is a partial configuration bitstream that implements region 416 including partial reconfiguration region 420. To complete the partial reconfiguration boot process, the accelerator driver loads the partial configuration bitstream from container 410 into configuration memory of programmable IC 220 via PCAP 906 to implement region 416. Responsive to loading the second stage boot configuration bitstream, partial reconfiguration region 420 includes circuit 422.

The accelerator driver further reads the clearing configuration bitstream from container 410 and loads, e.g., caches, the clearing configuration bitstream in RAM 235 using memory controller 904 for subsequent use. The clearing configuration bitstream is a partial configuration bitstream that is loaded to prepare partial reconfiguration region 420 before another partial configuration bitstream may be loaded into programmable IC 220 to implement different circuitry within partial reconfiguration region 420. The clearing configuration bitstream is a companion clearing configuration bitstream to configuration bitstream. Container 410 packages the two complementary configuration files together in a single file.

In the case where processor 105 is a soft processor, configuration bitstream 915 may be loaded first to implement processor 105 using programmable circuitry of programmable IC 220. In some cases, the program code executed by processor 105 may be included in configuration bitstream 915 and boot loader 910 is not required. In other cases, boot loader 910 may be loaded subsequent to loading configuration bitstream 915. Processor 105 may continue operation as described once operational.

The example illustrated in FIG. 9 may operate as described with reference to FIGS. 4, 5, 7, and 8 where processor 105, as the host processor, obtains further containers from flash memory 225 (as a bulk storage device), obtains clearing configuration bitstreams from the containers, and caches the clearing configuration bitstreams in RAM 235. In other arrangements, the example of FIG. 9 may be used to implement an architecture as described in FIG. 6 where processor 105, being on-chip in programmable IC 220, is used to provide configuration files to one or more other devices 230 and/or 240 via the network adapter 404.

Within this disclosure, the programmable IC is described as including one partial reconfiguration region. In other examples, the programmable IC may include two or more partial reconfiguration regions. In that case, a container may include more than one configuration bitstream and more than one clearing configuration bitstream. For example, a container may include a first configuration bitstream for a first partial reconfiguration region, a clearing configuration bitstream for the first configuration bitstream, a second configuration bitstream for a second partial reconfiguration region, and a clearing configuration bitstream for the second configuration bitstream. The host processor may cache the clearing configuration bitstreams for subsequent use. The clearing configuration bitstreams may be used independently by the host processor as needed upon reconfiguring the first and/or second partial reconfiguration regions of the programmable IC.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise. As defined herein, the term "another" means at least a second or more. As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together. As defined herein, the term "automatically" means without user intervention.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

As defined herein, the term "coupled" means connected, whether directly without any intervening elements or indirectly with one or more intervening elements, unless otherwise indicated. Two elements may be coupled mechanically, electrically, or communicatively linked through a communication channel, pathway, network, or system. As defined herein, the terms "includes," "including," "comprises," and/or "comprising," specify the presence of stated features, integers, steps, operations, elements, and/or components, but do not preclude the presence or addition of one or more other features, integers, steps, operations, elements, components, and/or groups thereof. As defined herein, the term "output" means storing in physical memory elements, e.g., devices, writing to display or other peripheral output device, sending or transmitting to another system, exporting, or the like. As defined herein, the term "plurality" means two or more than two.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context. As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "real time" means a level of processing responsiveness that a user or system senses as sufficiently immediate for a particular process or determination to be made, or that enables the processor to keep up with some external process. As defined herein, the term "user" means a human being. The terms first, second, etc.

may be used herein to describe various elements. These elements should not be limited by these terms, as these terms are only used to distinguish one element from another unless stated otherwise or the context clearly indicates otherwise.

In some instances, the term "signal" may be used within this disclosure to describe physical structures such as terminals, pins, signal lines, wires. In other instances, the term "signal" may be used to refer to particular values specified by a wire. The term "signal" may refer to the conveyance of a single bit, e.g., a single wire, or the conveyance of multiple parallel bits through multiple parallel wires. Further, each signal may represent bi-directional communication between two, or more, components connected by the signal.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

A method of managing an accelerator may include, responsive to determining a first container including a first configuration file and a second configuration file, caching, using a host processor, the second configuration file within a local memory of the host processor and providing, using the host processor, the first configuration file to a device of the accelerator. The method may include, responsive to a configuration event, providing, using the host processor, the cached second configuration file from the local memory to the device of the accelerator.

In one aspect, the first configuration file is partial configuration bitstream and the second configuration file is a clearing configuration bitstream that is a companion to the partial configuration bitstream. The partial configuration bitstream may be a second stage configuration bitstream for a boot process of a programmable IC.

The programmable IC may load a first stage configuration bitstream that implements a network adapter establishing a communication link with the host processor. In that case, the method may also include, responsive to establishing the communication link, determining an attribute of the device specifying at least one of a type of the device or a boot procedure for the device using the communication link. The first container may be determined based upon the attribute. Further, the first and second configuration files may be provided to the device over the communication link.

The method may include determining a second container including a third configuration file and a fourth configuration file, clearing the second configuration file from the local memory and caching the fourth configuration file from the second container into the local memory, and providing the third configuration file from the second container to the device of the accelerator.

The accelerator may include a plurality of different devices. The first container may include a configuration file for at least two of the plurality of different devices. The first configuration file and the second configuration file may be for a first device of the plurality of devices. Accordingly, the method may include providing a third configuration file from the first container to a second device of the plurality of different devices of the accelerator.

In another aspect, the device may include programmable circuitry of a programmable IC. The host processor may load an accelerator driver that binds to the device. The accelerator driver may perform the providing of the first configuration file to the device automatically. The accelerator driver may perform the caching of the second configuration file automatically.

A system may include a device, a local memory, and a host processor coupled to the local memory and the device. The host processor may be configured to initiate executable operations. The executable operations may include, responsive to determining a first container including a first configuration file and a second configuration file, caching the second configuration file within the local memory of the host processor and providing the first configuration file to the device over a communication link. The executable operations may also include, responsive to a configuration event, providing the cached second configuration file from the local memory to the device over the communication link.

In one aspect, the device may be a programmable IC. The first configuration file may be a partial configuration bitstream. The second configuration file may be a clearing configuration bitstream that is a companion to the partial configuration bitstream. The partial configuration bitstream may be a second stage configuration bitstream for a boot process of the programmable IC.

The programmable IC may load a first stage configuration bitstream that implements a network adapter establishing the communication link with the host processor. The host processor may be configured to initiate executable operations further including, responsive to establishing the communication link, determining an attribute of the device specifying at least one of a type of the device or a boot procedure for the device. The first container may be determined based upon the attribute.

The host processor may be configured to initiate executable operations further including determining a second container including a third configuration file and a fourth configuration file, clearing the second configuration file from the local memory and caching the fourth configuration file from the second container into the local memory, and providing the third configuration file from the second container to the device over the communication link.

In another aspect, the device may be a first device of a plurality of different devices. The first container may include a configuration file for at least two of the plurality of different devices. The first configuration file and the second configuration file may be for the first device. Accordingly, the host processor may be configured to initiate executable operations further including providing a third configuration file from the first container to a second device of the plurality of different devices.

In yet another aspect, the device may be a programmable IC. The host processor may load an accelerator driver that binds to the programmable IC. The accelerator driver may perform the providing of the first configuration file to the programmable IC automatically. The accelerator driver may perform the caching of the second configuration file automatically.

An IC may include programmable circuitry, a memory controller, and a processor coupled to the programmable circuitry and the memory controller. The processor may be configured to initiate executable operations including, responsive to determining a first container including a first configuration file and a second configuration file, caching the second configuration file within a local memory of the processor using the memory controller, loading the first configuration file into the IC implementing a circuit using the programmable circuitry, and, responsive to a configuration event, loading the cached second configuration file from the local memory into the IC.

In one aspect, the first configuration file may be a partial configuration bitstream and the second configuration file may be a clearing configuration bitstream that is a companion to the partial configuration bitstream. The partial configuration bitstream may be a second stage configuration bitstream for a boot process of the IC.

In another aspect, the memory controller is a hardwired circuit block of the IC.

In still another aspect, the processor may be configured to load a first stage configuration bitstream that implements the memory controller using the programmable circuitry.

The processor may be configured to initiate executable operations further including determining a second container including a third configuration file and a fourth configuration file, clearing the second configuration file from the local memory and caching the fourth configuration file from the second container into the local memory, and loading the third configuration file from the second container.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method of managing an accelerator using a data processing system coupled to the accelerator, the method comprising:
   determining, using a host processor of the data processing system, a first container including a first configuration file and a second configuration file stored on a bulk storage device;
   responsive to determining that the first configuration file and the second configuration file are related, caching, using the host processor, the second configuration file within a local memory of the host processor;
   providing, using the host processor, the first configuration file to a device of the accelerator, wherein the first configuration file configures the device; and
   responsive to detecting a configuration event, providing, using the host processor, the cached second configuration file from the local memory to the device of the accelerator, wherein the second configuration file further configures the device;
   wherein the second configuration file is stored in the local memory until provided to the device in response to the configuration event.

2. The method of claim 1, wherein the first configuration file is partial configuration bitstream and the second configuration file is a clearing configuration bitstream that is a companion to the partial configuration bitstream.

3. The method of claim 2, wherein the partial configuration bitstream is a second stage configuration bitstream for a boot process of a programmable integrated circuit.

4. The method of claim 3, wherein the programmable integrated circuit loads a first stage configuration bitstream that implements a network adapter establishing a communication link with the host processor, the method further comprising:
   responsive to establishing the communication link, determining an attribute of the device comprising at least one of a type of the device or a boot procedure for the device using the communication link, wherein the first container is determined based upon the attribute and the first and second configuration files are provided to the device over the communication link.

5. The method of claim 1, further comprising:
   determining a second container including a third configuration file and a fourth configuration file;
   clearing the second configuration file from the local memory and caching the fourth configuration file from the second container into the local memory; and
   providing the third configuration file from the second container to the device of the accelerator.

6. The method of claim 1, wherein the accelerator comprises a plurality of different devices, the first container includes a configuration file for at least two of the plurality of different devices, and the first configuration file and the second configuration file are for a first device of the plurality of devices, the method further comprising:
   providing a third configuration file from the first container to a second device of the plurality of different devices of the accelerator.

7. The method of claim 1, wherein the device comprises programmable circuitry of a programmable integrated circuit, the host processor loads an accelerator driver that binds to the device, the accelerator driver performs the providing of the first configuration file to the device automatically, and the accelerator driver performs the caching of the second configuration file automatically.

8. A system, comprising:
   a device;
   a local memory; and
   a host processor coupled to the local memory and the device and configured to initiate executable operations including:
   determining a first container including a first configuration file and a second configuration file stored on a bulk storage device of the system;
   responsive to determining that the first configuration file and the second configuration file are related, caching the second configuration file within the local memory;
   providing the first configuration file to the device over a communication link, wherein the first configuration file configures the device; and
   responsive to detecting a configuration event, providing the cached second configuration file from the local memory to the device over the communication link, wherein the second configuration file further configures the device;
   wherein the second configuration file is stored in the local memory until provided to the device in response to the configuration event.

9. The system of claim 8, wherein the device is a programmable integrated circuit, the first configuration file is partial configuration bitstream, and the second configuration file is a clearing configuration bitstream that is a companion to the partial configuration bitstream.

10. The system of claim 9, wherein the partial configuration bitstream is a second stage configuration bitstream for a boot process of the programmable integrated circuit.

11. The system of claim 10, wherein the programmable integrated circuit loads a first stage configuration bitstream that implements a network adapter establishing the communication link with the host processor, wherein the host processor is configured to initiate executable operations further comprising:
   responsive to establishing the communication link, determining an attribute of the device comprising at least one of a type of the device or a boot procedure for the device, wherein the first container is determined based upon the attribute.

12. The system of claim 8, wherein the host processor is configured to initiate executable operations further comprising:
   determining a second container including a third configuration file and a fourth configuration file;
   clearing the second configuration file from the local memory and caching the fourth configuration file from the second container into the local memory; and
   providing the third configuration file from the second container to the device over the communication link.

13. The system of claim 8, wherein the device is a first device of a plurality of different devices, the first container includes a configuration file for at least two of the plurality of different devices, and the first configuration file and the second configuration file are for the first device, wherein the host processor is configured to initiate executable operations further comprising:
   providing a third configuration file from the first container to a second device of the plurality of different devices.

14. The system of claim 8, wherein the device is a programmable integrated circuit, the host processor loads an accelerator driver that binds to the programmable integrated circuit, the accelerator driver performs the providing of the first configuration file to the programmable integrated circuit automatically, and the accelerator driver performs the caching of the second configuration file automatically.

15. An integrated circuit, comprising:
programmable circuitry;
a memory controller; and
a processor coupled to the programmable circuitry and the memory controller, wherein the processor is configured to initiate executable operations comprising:
determining a first container including a first configuration file and a second configuration file stored on a bulk storage device;
responsive to determining that the first configuration file and the second configuration file are related, caching the second configuration file within a local memory of the processor using the memory controller;
loading the first configuration file into the integrated circuit, wherein the first configuration file configures the programmable circuitry by implementing a circuit using the programmable circuitry; and
responsive to detecting a configuration event, loading the cached second configuration file from the local memory into the integrated circuit, wherein the second configuration file further configures the programmable circuitry;
wherein the second configuration file is stored in the local memory until loaded into the integrated circuit in response to the configuration event.

16. The integrated circuit of claim 15, wherein the first configuration file is partial configuration bitstream and the second configuration file is a clearing configuration bitstream that is a companion to the partial configuration bitstream.

17. The integrated circuit of claim 16, wherein the partial configuration bitstream is a second stage configuration bitstream for a boot process of the integrated circuit.

18. The integrated circuit of claim 15, wherein the memory controller is a hardwired circuit block of the integrated circuit.

19. The integrated circuit of claim 15, wherein the processor is configured to load a first stage configuration bitstream that implements the memory controller using the programmable circuitry.

20. The integrated circuit of claim 15, wherein the processor is configured to initiate executable operations further comprising:
determining a second container including a third configuration file and a fourth configuration file;
clearing the second configuration file from the local memory and caching the fourth configuration file from the second container into the local memory; and
loading the third configuration file from the second container.

* * * * *